Sept. 16, 1969  R. W. BUSHMEYER  3,467,002
SEGMENTAL ROLLERS FOR CORE-FORMING MACHINE
Filed June 20, 1967  2 Sheets-Sheet 1
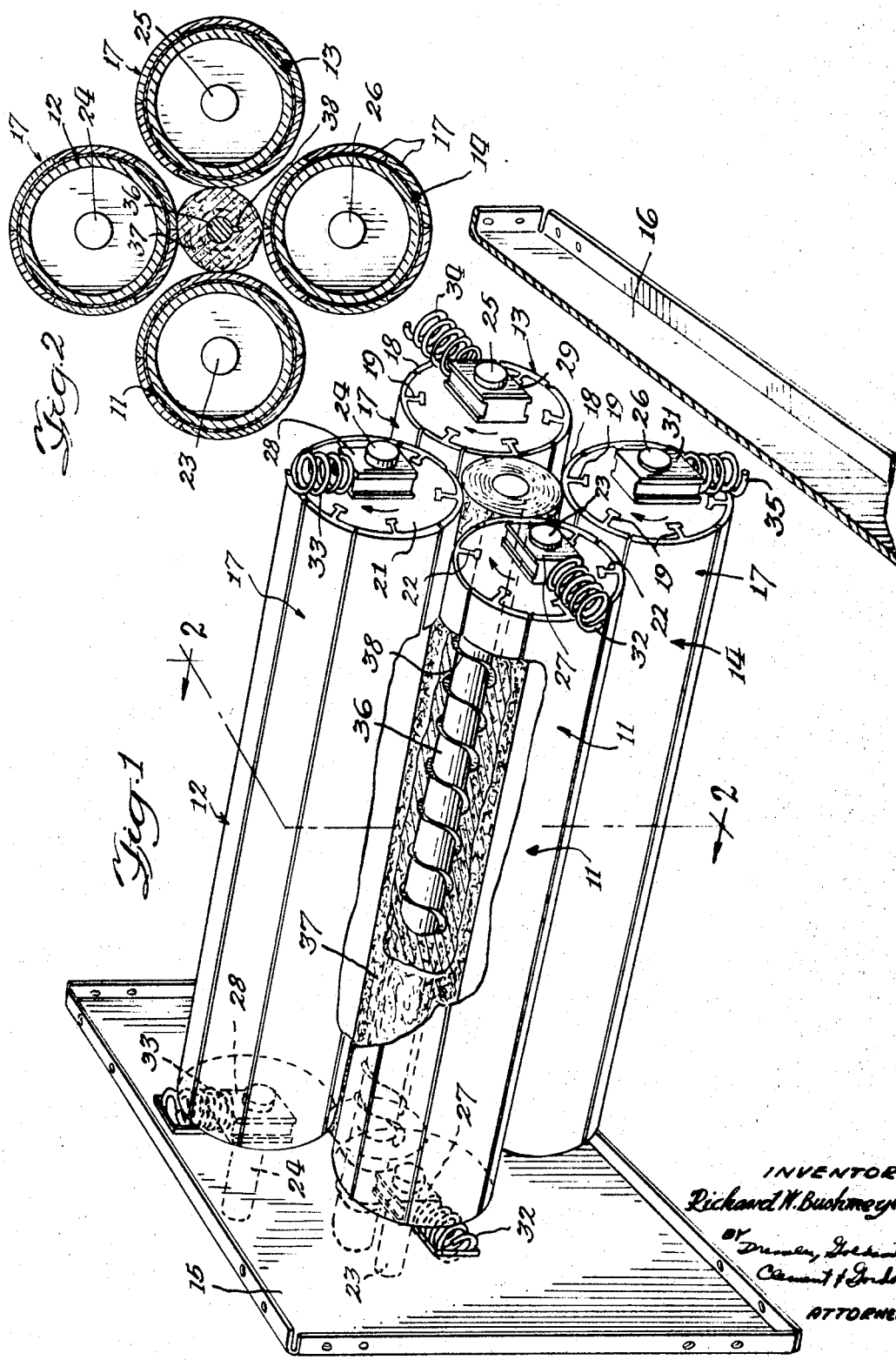
INVENTOR
Richard W. Bushmeyer
ATTORNEYS

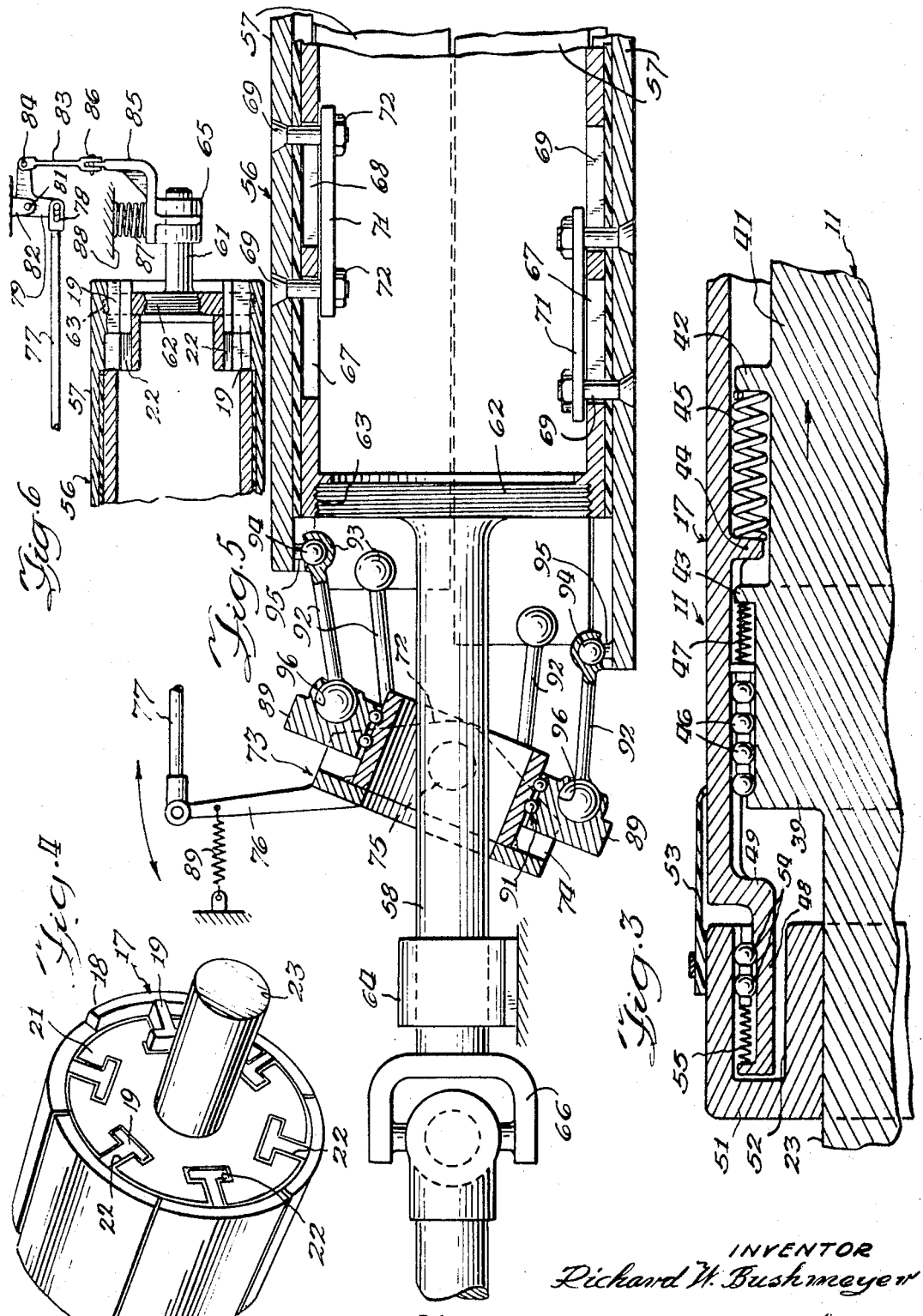

United States Patent Office 3,467,002
Patented Sept. 16, 1969

3,467,002
SEGMENTAL ROLLERS FOR CORE-FORMING MACHINE
Richard W. Bushmeyer, Rockford, Ill., assignor to J. I. Case Company, a corporation of Wisconsin
Filed June 20, 1967, Ser. No. 647,354
Int. Cl. B30b 3/04
U.S. Cl. 100—89                                      15 Claims

ABSTRACT OF THE DISCLOSURE

Feed crop material, such as hay, for example, is fed into a wrapping chamber defined by a plurality of continuously rotating cylindrical rollers mounted in parallel relationship, and is formed into an elongated core that is moved longitudinally toward the discharge end of the machine. Each of the rollers has its outer surface made up of longitudinally extending segments that are mounted for longitudinal movement relative to the rollers. As each segment is moved into engagement with the elongated core, it moves longitudinally with the core. The simultaneous longitudinal movement of the core and the segments in engagement therewith prevents relative sliding movement between the core and the wrapping rollers. Apparatus is also provided to adjust the longitudinal speed of the segments in response to a variation in feeding rate into the wrapping chamber.

---

The present invention is primarily concerned with means for forming feed crop material into pellets of uniform density. It has been recognized that any sliding movement of the core relative to the wrapping rollers impairs the formation of the core, with the result that the pellets cut therefrom are not of good quality. Heretofore, it has been proposed to make the wrapping rollers of special shape in order to prevent such relative sliding movement, as described in the prior, copending application, Ser. No. 287,175, filed June 10, 1963, in which I am a joint inventor. The fabrication of rollers of special shape is relatively expensive, compared to the cost of cylindrical rollers, but prior to the present invention nobody has devised any practical way of eliminating relative sliding movement between the core of feed crop material and wrapping rollers of cylindrical shape.

In the following specification, the invention is described with particular reference to different structural embodiments. The structures are designed to prevent damage to the core of feed crop material that may be caused by sliding movement of the core relative to the surface of the rollers in engagement therewith. In each embodiment the cylindrical wrapping rollers are rotated continuously to move the segments of each roller successively into and out of engagement with the elongated core. Each segment of each roller moves longitudinally with the core during the interval it is in engagement with the core.

In one embodiment of the invention, the hay core is moved longitudinally of the rollers, and the core moves each segment of each roller longitudinally during the interval the segment is in engagement therewith. The core moves the segments in the same direction in which it is moving, and thus prevents sliding movement between the core and the rollers. In this embodiment, each segment is moved rearwardly to its initial positions by either spring or cam means during the interval when it is out of engagement with the core.

In the second embodiment of the invention, a positive driving force is applied to each segment to reciprocate the segments longitudinally of the rollers. As the rotation of the rollers carries each segment successively into engagement with the core, it cooperates with the segments of the other rollers that are in engagement with the core at the same time to move the core longitudinally toward the discharge end of the machine. The longitudinal movement of the core with segments of the wrapping rollers prevents relative sliding movement of the core relative to the rollers. The reciprocating movement of the segments is so arranged that each segment is moved rearwardly to its initial position during the interval when it is out of engagement with the core.

Both embodiments of the invention include means for varying the speed of the longitudinal movement of the core in accordance with the rate at which the feed crop material enters the wrapping chamber in order to maintain a uniform core density regardless of the rate at which the feed crop material enters the wrapping chamber.

Suitable structure by means of which the above mentioned and other advantages of the invention are attained will be described in the following specification, taken in conjunction with the accompanying drawings, showing two preferred illustrative embodiments of the invention, in which:

FIGURE 1 is a fragmentary perspective view of a wrapping chamber comprising a plurality of wrapping rollers having longitudinally extending segments mounted for longitudinal movement;

FIGURE 2 is a cross-sectional view taken in the plane indicated by the line 2—2 of FIGURE 1;

FIGURE 3 is an enlarged fragmentary sectional view, showing a spring means for returning a segment back to its initial position;

FIGURE 4 is a fragmentary perspective view showing the outer end of a wrapping roller using a T-section and groove to retain the section;

FIGURE 5 is a fragmentary view, partly in section, and partly in elevation, showing another embodiment of the wrapping roller in which positive driving means are applied to the segments of the rollers; and FIGURE 6 is a fragmentary view, similar to FIGURE 5, but showing the opposite end of the wrapping roller with a sensing linkage associated therewith.

In FIGURES 1 to 4 of the drawings, four cylindrical wrapping rollers 11, 12, 13, and 14 are rotatably mounted in spaced parallel relationship between two upright frame members 15 and 16 to define a wrapping chamber between them. Each roller has a plurality of segments 17 extending longitudinally thereof and mounted for longitudinal movement relative to the rollers. Each segment comprises an arcuate outer section 18 and an internal rib 19. The number of segments used in the roller is not critical, but the total outer surface area of the arcuate sections must approximately equal the circumferential surface of the roller. In the roller shown in the drawings, six segments are provided, and each arcuate section has an outer surface area approximately equal to one sixth of the circumferential area of the roller. The ribs 19 extend longitudinally of the roller and are T-shaped in cross section. The roller has one or more guide members 21 slotted, as indicated at 22, to receive the ribs 19.

The rollers 11, 12, 13, and 14 are mounted on shafts 23, 24, 25, and 26, respectively, that are rotatably supported at opposite ends of each roller and are continuously rotated at a common, uniform speed by any suitable drive means (not shown). The connections between the power supply and rollers are designed to permit radial movement of the rollers. The rotatable support for the shafts is provided by bearings 27, 28, 29, and 31 that are slidably mounted in the frame members 15 and 16 located at the opposite ends of the rollers. The bearings 27, 28, 29, and 31 are urged toward the center of the core chamber by compression springs 32, 33, 34, and 35, respectively, and are moved outwardly, against the action of the springs, by increases in the rate at which the hay, or other feed crop material, is fed into the wrapping chamber. As the hay enters the wrapping chamber between two of the rollers, it is wrapped around a spindle 36 to form an elongated core 37 by the interaction of the outer surfaces of the wrapping rollers with hay. The spindle may be cylindrical, but is preferably tapered to reduce the diameter of the spindle toward the discharge end of the wrapping chamber.

The spindle 36 extends through the wrapping chamber and is provided with a helical rib 38 on its outer surface. It is rotated at a constant speed, which may be the same speed as the speed of the rollers, or may be different. The spindle 36 acts to move the hay core 37 longitudinally of the rollers as it is formed. The use of the cylindrical wrapping rollers for making the hay core has heretofore been unsatisfactory because of high power requirements and the tendency of the friction, created by the relative sliding movement between the outer surface of the rollers and the hay, to destroy the core as it is moved longitudinally of the rollers.

In the embodiment of FIGURES 1 to 4, each segment 17 of each roller is moved successively into and out of engagement with the hay core 37 as the rollers are rotated. The sliding friction of the segments relative to the rollers in which they are mounted, is so low that each segment is easily moved longitudinally in the same direction and at the same speed as the hay core 37 by the engagement of the segments with the core. The simultaneous longitudinal movement of the core 37 and the segments 17 in engagement therewith essentially prevents any relative sliding movement between the core and the rollers. Since there is no consequential relative sliding movement between the core and the outer surface of the rollers, there is essentially no friction to interfere with the longitudinal movement of the core.

The rate of the longitudinal movement of the hay core remains the same as long as the operating conditions are unchanged. The relative speeds of the helical spindle and rollers and the spindle lead are proportioned to provide minimum longitudinal movement when the hay core has its minimum diameter. As the feeding rate increases, the slidable bearings permit each of the wrapping rollers to move outwardly, against the action of the springs, and the diameter of the wrapping chamber increases. The diameter of the hay core also increases and, consequently, the rotational speed of the core decreases. The reduced rotational speed of the core and the constant speed of the wrapping rollers create a greater relative speed difference between the hay core and the helical spindle, thereby increasing the rate of longitudinal movement of the hay. The increase in the rate of longitudinal movement of the hay core is proportional to the increase in the rate of feeding the hay into the wrapping chamber, and thus the density of the hay core is maintained substantially uniform.

When the rate of feeding the hay into the wrapping chamber decreases, the diameter of the core decreases, and the springs move the rollers inwardly to keep them in engagement with the outer surface of the hay core. This change of diameter of the core increases the rotational speed of the hay core and creates a lesser relative speed difference between the hay core and the helical spindle. The reduction in the relative speed difference between the hay core and the helical spindle reduces the rate of the longitudinal movement of the hay core. The decrease in the rate of longitudinal movement of the hay core enables the density of the hay core to remain substantially uniform.

As each wrapping roller is rotated, its segments move successively into and out of engagement with the hay core. Since each segment remains in engagement with the core, only a short time during each revolution of the roller, it is moved longitudinally only a short distance by the core during each revolution. It is necessary to return the segment to its initial position before it is again rotated into engagement with the hay core. The return movement of the segments may be accomplished by any suitable means, such as, for example, cam or spring means. The longitudinal movement of the segments 17 may be best understood by reference to FIGURE 3 of the drawings, in which spring means are utilized for returning the segments to their initial positions when they are rotated out of engagement with the hay core.

In FIGURE 3, the wrapping roller 11 comprises a section 39 of maximum diameter and a section 41 of lesser diameter adjacent thereto. An annular flange 42 extends outwardly from the outer surface of the section 41 in spaced relationship to an annular flange 43 at the adjacent end of the section 39. An annular flange 44 connected to segment 17 extends inwardly between the flanges 42 and 43. A compression spring 45 is biased between the flanges 42 and 44 to urge the flange 44 away from the flange 42, thus urging the segment 17 toward its initial position. When the longitudinally moving hay core engages a segment 17 of the wrapping roll and moves it to the right, as viewed in FIGURE 3, the spring 45 is compressed. When the particular segment is rotated out of engagement with the hay core, the spring 45 moves it back to its initial position.

The peripheral surface of the section 39 is recessed to receive a plurality of ball bearings 46 and a spring 47 that are positioned between the inner surface of the segment 17 and the outer surface of section 39 of the roller 11. The end portion 48 of the segment 17 at the left of FIGURE 3 is offset inwardly, as indicated at 49. A collar 51 secured to the shaft 23 in spaced relationship from section 39 of the roller 11 has an annular recess 52 into which the end portion 48 of the segment 17 extends. A plastic sealing ring 53 is secured to the collar 51 and covers the gap between the collar and the offset 49 of the segment 17. Ball bearings 54 are positioned between the end portion 48 and the outer wall of the recess 52 and are urged toward the offset 49 by a spring 55. The bearings 46 and 54 facilitate the longitudinal movement of the segment 17.

In the embodiment of the invention illustrated in FIGURE 5, only a single wrapping roller 56 is shown, but it will be understood that a plurality of the rollers are arranged in a manner similar to the arrangement of FIGURE 1 to define a wrapping chamber. The wrapping chamber having the rollers of FIGURE 5 may include a spindle, but the spindle is not essential because the hay core is moved longitudinally toward the discharge end of the wrapping chamber by segments 57 rather than by a spindle.

Each roller 56 is secured to a shaft 58 in any suitable manner. In the drawing, the shaft comprises two rods 59 and 61 each having an enlarged end 62 threaded to screw into complementary threads adjacent opposite ends of the roller, as indicated at 63. The shaft rods 59 and 61 are rotatably supported in bearings 64 and 65, respectively. The shaft rod 59 is provided with a coupling 66 that permits relative movement of the rollers. When the rate at which the hay enters the wrapping chamber increases, the rollers move away from each other, and when it decreases, the rollers move toward each other. The significance of such movement will appear later in connection with the description of the means for moving the segments longitudinally of the rollers.

The segments 57 are mounted on the wrapping roller in a manner different from the manner in which the segments 17 are mounted on the rollers in the embodiment of FIGURES 1 to 4. The wrapping roller 56 is provided with a pair of longitudinally spaced slots 67 and 68 located under each segment 57. Each segment 57 is secured to the roller by a pair of screws 69, or similar members that extend through slots 67 and 68. A plate 71 positioned under each pair of slots is apertured to receive the pair of screws 69 and is held on the screws by nuts 72.

The nuts hold the headed end of the screws flush with the outer surface of the segments. The screws act as stops to limit the longitudinal movement of the segments.

The longitudinal movement of the segments is controlled by an annular collar 73 fitting around the shaft rod 59. The collar 73 has a plate 74 secured to one side thereof that has a pivotal connection, as indicated at 75, for adjusting the angularity of the collar 73 relative to the shaft 58. A control arm 76 extending outwardly from the collar 73 has its outer end secured to a link 77 that is part of a sensing linkage connected to the shaft rod 61. The other end of the link 77 has a slotted pivotal connection 78 to one end of a bell crank 79. The bell crank is pivoted, as indicated at 81, to any suitable stationary mounting 82. The other end of the bell crank 79 has one end of a link 83 pivotally connected thereto, as indicated at 84. A rod 85 having its lower end rigidly secured to the upper surface of the bearing 65 has its upper end pivotally connected to the lower end of the link 83, as indicated at 86, so that displacement of the shaft rod 61 will move the bell crank 79 about its pivot and thereby cause the link 77 to move the collar 73 about the pivot 75. When an increase in the rate of feeding the crop material to the wrapping chamber causes the rollers to move away from each other, the collar is moved pivotally to the right, as viewed in FIGURE 5, and it is moved in the opposite direction when the rollers move toward each other.

Suitable spring means urge the rollers toward each other to insure such movement of the rollers when the rate of feed decreases. A compression spring 87 that is biased between a stationary surface 88 and the top of the bearing 65 urges the shaft rod 61 toward its normal position. The action of the spring 87 is preferably assisted by a spring 89 that exerts a continuous pulling force against the control arm 76.

A ring 89 encircling the collar 73 is mounted for rotational movement relative thereto by means of a ball race 91. The ring is connected to the segments 57 by means of a plurality of links 92. Each link has a socket 93 at one end to provide a ball joint connection with the head 94 of a stud 95 extending inwardly of the roller from the underside of each segment adjacent one end thereof. The other end of each link is connected by a ball joint to a socket 96 provided therefor in the ring 89.

The collar 73 is adjusted to any desired angular relationship to the axis of the shaft 58 before the core wrapping operation is started, and will remain in that particular relationship as long as the feeding conditions remain constant. Rotation of the shaft 58 rotates the roller 56, and each segment carries its link 92 around with it. The ball joint interengagement of the links 92 with the ring 89 and the segments 57 moves the ring 89 rotationally about the ball race 91.

The angular disposition of the race 91, relative to the longitudinal axis of the shaft 58, causes the segments 57 to reciprocate longitudinally between the position indicated by the uppermost segment of the roller 56 shown in FIGURE 5 to the position indicated by the lowermost segment of the roller 56. Since the roller is rotated at a constant speed, the rate of longitudinal movement of the segments remains constant as long as the angularity of the collar 73 remains unchanged. If the collar is moved pivotally to the right, as viewed in FIGURE 5, the longitudinal distance between the left hand ends of the uppermost and lowermost segments is increased. Since each segment must move this distance in each direction during one revolution of the roller, the longitudinal movement of the segments is speeded. As each segment engages the hay core, it moves the hay core toward the right at a faster rate than when the collar 73 has been moved to the left. The density of the core remains uniform because the longitudinal speed of the segments of the rollers is varied in proportion to the amount of hay entering the wrapping chamber in any particular interval of time.

Although two preferred embodiments of the invention have been described in considerable detail, it will be understood that the description thereof is intended to be illustrative, rather than restrictive, as many details of construction may be modified or changed without departing from the spirit or scope of the invention. Accordingly, it is not desired to be restricted to the exact structure described.

What is claimed is:

1. A roller assembly for a core-forming machine comprising a plurality of rollers rotatably mounted in spaced relationship for wrapping fibers fed therebetween into an elongated core movable longitudinally of said rollers for discharge from one end of said roller assembly, means for rotating said rollers, at least one of said rollers having an outer surface comprising a plurality of longitudinally extending segments, and means for mounting said segments for longitudinal movement relative to said rollers, whereby relative sliding movement between said rollers and said core is prevented.

2. A roller assembly as recited in claim 1 and having means for moving said segments and said core together toward the discharge end of said roller assembly when interengaged, and means moving said segments back to their initial positions when they are out of engagement with said core.

3. A roller assembly as recited in claim 2, in which said rollers are spring mounted in parallel relationship to permit them to move toward or away from the center of said assembly in response to any variation in the rate of feeding said fibers therebetween, said assembly having means for increasing the speed of the longitudinal movement of said segments with any increase in said feeding rate and for reducing the speed of said longitudinal movement with any reduction in said rate.

4. A roller assembly as recited in claim 1 and having a spindle located between said rollers, and drive means for rotating said spindle, the relative rates of rotation of said spindle and said rollers being regulated to control the speed of the longitudinal movement of said core.

5. A roller assembly as recited in claim 1 and having spring means for moving each of said segments back to its initial position when it is out of engagement with said core.

6. A roller assembly as recited in claim 1 and having drive means for reciprocating each of said segments longitudinally of its roller as said roller is rotated, each of said segments engaging said core to move it toward the discharge end of said roller assembly during a portion of the rotational movement of said rollers.

7. A roller assembly as recited in claim 1 and having a plurality of rotatable shafts, each of said rollers being mounted on one of said shafts, an angularly disposed collar encircling each of said shafts, a ring rotatably mounted on each of said collars, and a link connecting each of said segments to one of said rings, whereby rotational movement of said shafts reciprocates the segments of each of said rollers.

8. A roller assembly as recited in claim 7 and having means for pivotally mounting each of said collars, a control arm secured to each of said collars, and a linkage connecting each of said control arms to the roller mounted on the shaft encircled by the related collar, whereby relative movement between said rollers adjusts the angularity of each of said collars relative to its shaft, whereby the speed of the longitudinal movement of said segments is changed in accordance with changes in the rate at which feed crop material enters said roller assembly.

9. A roller assembly as recited in claim 8, in which a ball race is mounted on each of said collars and each of said rings engages the race on its collar.

10. A roller assembly as recited in claim 1 and having an angularly disposed collar encircling the shaft of said one roller, means interconnecting said collar and each of said segments whereby rotation of said collar moves said segments longitudinally of said roller, a control arm extending outwardly from said collar, and linkage interconnecting said shaft and said control arm, whereby displacement of said shaft in response to variation in the rate of feed moves said control arm to vary the angularity of said collar and thereby varies the speed of the longitudinal movement of said segments.

11. In an apparatus comprising a plurality of rollers mounted on rotatable shafts in spaced relationship and means for rotating said shafts for wrapping fibers fed between said rollers into an elongated core, the improvement comprising a roller having an outer surface comprising a plurality of segments, and means for mounting said segments for longitudinal movement relative to said roller.

12. A roller as recited in claim 11, in which an angularly disposed collar is pivotally mounted in spaced relationship to one end of said roller, and a link interconnects each of said segments with said collar.

13. A roller as recited in claim 12, in which a ball race is mounted on said collar, a ring is mounted on said ball race, and each of said links has one end secured to said ring.

14. A roller as recited in claim 11, in which each of said segments has an integral rib projecting from its inner surface, and the roller has a guide member provided with slots to receive said ribs.

15. A roller as recited in claim 14, in which said ribs and said slots are T-shaped to prevent relative radial movement between each segment and the roller on which it is mounted.

References Cited

UNITED STATES PATENTS 2,367,911   1/1945   Wells.
3,269,098   8/1966   Bushmeyer et al. __ 100—89 XR ROBERT L. BLEUTGE, Primary Examiner